United States Patent
Chaudhry et al.

(10) Patent No.: US 7,610,470 B2
(45) Date of Patent: Oct. 27, 2009

(54) PREVENTING REGISTER DATA FLOW HAZARDS IN AN SST PROCESSOR

(75) Inventors: Shailender Chaudhry, San Francisco, CA (US); Paul Caprioli, Santa Clara, CA (US); Marc Tremblay, Menlo Park, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 252 days.

(21) Appl. No.: 11/703,462

(22) Filed: Feb. 6, 2007

(65) Prior Publication Data

US 2008/0189531 A1 Aug. 7, 2008

(51) Int. Cl.
G06F 9/38 (2006.01)

(52) U.S. Cl. .................................................. 712/220
(58) Field of Classification Search .................. 712/220
See application file for complete search history.

(56) References Cited

U.S. PATENT DOCUMENTS

| | | | |
|---|---|---|---|
| 7,051,191 B2 * | 5/2006 | Kottapalli et al. | 712/217 |
| 7,350,027 B2 * | 3/2008 | Gara et al. | 711/121 |
| 2002/0083304 A1 * | 6/2002 | Leenstra et al. | 712/218 |
| 2004/0073777 A1 * | 4/2004 | Arnold et al. | 712/217 |

OTHER PUBLICATIONS

Martinez, J.F. etal., Speculative Synchronization: Applying Thread-Level Speculation to Explicitly Parallel Applications, 2002, ACM, pp. 18-29.*

Leibholz,D. etal., The Alpha 21264: A 500MHZ Out-of-Order Execution MIcroprocessor, 1997, IEEE, pp. 28-36.*

Steffan,G.J. etal., A Scalable Approach to Thread Level Speculation, 2000, ACM, 12 pages.*

Rajwar, R. etal., Speculative Lock Elison Enabling Highly Concurrent Multithreaded Execution, 2001, IEEE, pp. 294-305.*

* cited by examiner

Primary Examiner—Eric Coleman
(74) Attorney, Agent, or Firm—Park, Vaughan & Fleming LLP (57) ABSTRACT

One embodiment of the present invention provides a system that prevents data hazards during simultaneous speculative threading. The system starts by executing instructions in an execute-ahead mode using a first thread. While executing instructions in the execute-ahead mode, the system maintains dependency information for each register indicating whether the register is subject to an unresolved data dependency. Upon the resolution of a data dependency during execute-ahead mode, the system copies dependency information to a speculative copy of the dependency information. The system then commences execution of the deferred instructions in a deferred mode using a second thread. While executing instructions in the deferred mode, if the speculative copy of the dependency information for a destination register indicates that a write-after-write (WAW) hazard exists with a subsequent non-deferred instruction executed by the first thread in execute-ahead mode, the system uses the second thread to execute the deferred instruction to produce a result and forwards the result to be used by subsequent deferred instructions without committing the result to the architectural state of the destination register. Hence, the system makes the result available to the subsequent deferred instructions without overwriting the result produced by a following non-deferred instruction.

16 Claims, 5 Drawing Sheets

PREVENTING REGISTER DATA FLOW HAZARDS IN AN SST PROCESSOR

BACKGROUND

1. Field of the Invention

The present invention relates to techniques for improving the performance of computer systems. More specifically, the present invention relates to a method and apparatus for preventing register data flow hazards in a simultaneous speculative threading ("SST") processor.

2. Related Art

Advances in semiconductor fabrication technology have given rise to dramatic increases in microprocessor clock speeds. This increase in microprocessor clock speeds has not been matched by a corresponding increase in memory access speeds. Hence, the disparity between microprocessor clock speeds and memory access speeds continues to grow, and is beginning to create significant performance problems. Execution profiles for fast microprocessor systems show that a large fraction of execution time is spent not within the microprocessor core, but within memory structures outside of the microprocessor core. This means that the microprocessor systems spend a large fraction of time waiting for memory references to complete instead of performing computational operations.

When a memory reference, such as a load operation, generates a cache miss, the subsequent access to level-two (L2) cache (or main memory) can require dozens or hundreds of clock cycles to complete, during which time the processor is typically idle, performing no useful work.

A number of techniques are presently used (or have been proposed) to hide cache-miss latency. Some processors support out-of-order execution, in which instructions are kept in an issue queue, and are issued "out-of-order" when operands become available. Unfortunately, existing out-of-order designs have a hardware complexity that grows quadratically with the size of the issue queue. Practically speaking, this constraint limits the number of entries in the issue queue to one or two hundred, which is not sufficient to hide memory latencies as processors continue to get faster.

Some processors are designed to support "simultaneous multi-threading" (SMT), wherein two or more "threads" of execution run simultaneously on a single processor core. On conventional processors that do not support SMT and can only handle a single execution thread, processor resources can sometimes sit idle (such as when the thread stalls awaiting a data return from memory). In contrast, an SMT processor that supports multiple threads can generally employ processor resources more efficiently. For example, in one type of SMT processor, a high-priority thread runs on the processor until it encounters a stall condition. At this point, the processor can deactivate the high-priority thread and can activate a low-priority thread. When the stall condition is ultimately resolved, the processor can inactivate the low-priority thread and can reactivate the high-priority thread. In this way, the processor avoids sitting idle while the high-priority thread is not performing useful work.

In an alternative scheme, processor designers have suggested using "speculative-execution" to avoid pipeline stalls associated with cache misses. Two such proposed speculative-execution modes are: (1) execute-ahead mode and (2) scout mode. Execute-ahead mode operates as follows. During normal execution, the system issues instructions for execution in program order. Upon encountering a data-dependent stall condition during execution of an instruction, the system generates a checkpoint that can be used to return execution of the program to the point of the instruction. Next, the system executes subsequent instructions in the execute-ahead mode, wherein instructions that cannot be executed because of a data dependency are deferred, and wherein other non-deferred instructions are executed in program order.

When the unresolved data dependency is resolved during execute-ahead mode, the system enters a deferred-execution mode, wherein the system executes deferred instructions. If all of the deferred instructions are executed during this deferred-execution mode, the system returns to normal-execution mode to resume normal program execution from the point where the execute-ahead mode left off. Alternatively, if some deferred instructions were not executed during deferred-execution mode, the system returns to execute-ahead mode until the remaining unresolved data dependencies are resolved and the deferred instructions can be executed.

If the system encounters a non-data-dependent stall condition while executing in normal-execution mode or execute-ahead mode, the system moves into scout mode. In scout mode, instructions are speculatively executed to prefetch future loads and stores, but results are not committed to the architectural state of the processor. When the launch point stall condition (the unresolved data dependency or the non-data dependent stall condition that originally caused the system to move out of normal-execution mode) is finally resolved, the system uses the checkpoint to resume execution in normal-execution mode from the launch point instruction (the instruction that originally encountered the launch point stall condition).

By allowing the processor to perform work during stall conditions, speculative-execution can significantly increase the amount of computational work the processor completes.

Unfortunately, existing processor designs that support the above-described type of speculative execution also have limitations. For example, existing processor designs that support speculative execution can only execute one thread of speculative execution at a time. Consequently, the processor may not achieve the maximum possible computational throughput.

Hence, what is needed is a method and apparatus which increases the amount of parallelism that can be achieved during speculative execution.

SUMMARY

One embodiment of the present invention provides a system that prevents data hazards during simultaneous speculative threading. The system starts by executing instructions in an execute-ahead mode using a first thread. While executing instructions in the execute-ahead mode, the system maintains dependency information for each register indicating whether the register is subject to an unresolved data dependency. Upon the resolution of a data dependency during execute-ahead mode, the system copies dependency information to a speculative copy of the dependency information. The system then commences execution of the deferred instructions in a deferred mode using a second thread. While executing instructions in the deferred mode, if the speculative copy of the dependency information for a destination register indicates that a write-after-write (WAW) hazard exists with a subsequent non-deferred instruction executed by the first thread in execute-ahead mode, the system uses the second thread to execute the deferred instruction to produce a result and forwards the result to be used by subsequent deferred instructions without committing the result to the architectural state of the destination register. Hence, the system makes the result available to the subsequent deferred instructions without overwriting the result produced by a following non-deferred instruction.

In a variation on this embodiment, the dependency information maintained for each register includes a "not-there" bit, which indicates whether or not a value to be stored in the register by a preceding instruction is subject to an unresolved data dependency and is consequently not available. While executing an instruction during the execute-ahead mode, the system sets the not-there bit of a destination register for the instruction if a value to be stored in the destination register is "not-ready" or if any source operand of the instruction is not-there. On the other hand, the system unsets the "not-there" bit of a destination register for the instruction if a valid result is written to the destination register.

In a variation on this embodiment, the dependency information maintained for each register includes a speculative "not-there" bit, which indicates whether or not the register was subject to an unresolved data dependency when the second thread commenced execution in deferred mode.

In a variation on this embodiment, the dependency information maintained for each register includes a "write" bit, which indicates whether or not a value to be stored in the register during the deferred mode is subject to an unresolved data dependency. While executing a deferred instruction during the deferred mode, the system sets the "write" bit of the destination register for the deferred instruction if a value to be stored in the destination register is "not-ready," or if any source operand of the instruction has a "write" bit that is set. On the other hand, the system unsets the "write" bit of a destination register for the instruction if a valid result is written to the destination register.

In a variation of this embodiment, copying the dependency information to the speculative copy of the dependency information involves copying the "not-there" bits to the speculative "not-there" bits.

In a variation on this embodiment, dependency information for a destination register indicates that a WAW hazard potentially exists with a subsequent non-deferred instruction when the speculative "not-there" bit is unset, indicating that the destination register for a deferred instruction had no unresolved dependency as the second thread commenced execution in deferred mode.

In a variation on this embodiment, during execute-ahead mode instructions that can be executed are issued for execution and instructions that cannot be executed because of an unresolved data dependency are deferred into a deferred queue.

In a variation on this embodiment, during deferred mode deferred instructions that are able to be executed are executed in program order while deferred instructions that still cannot be executed because of unresolved data dependencies are deferred again.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Processor

Figure 1:
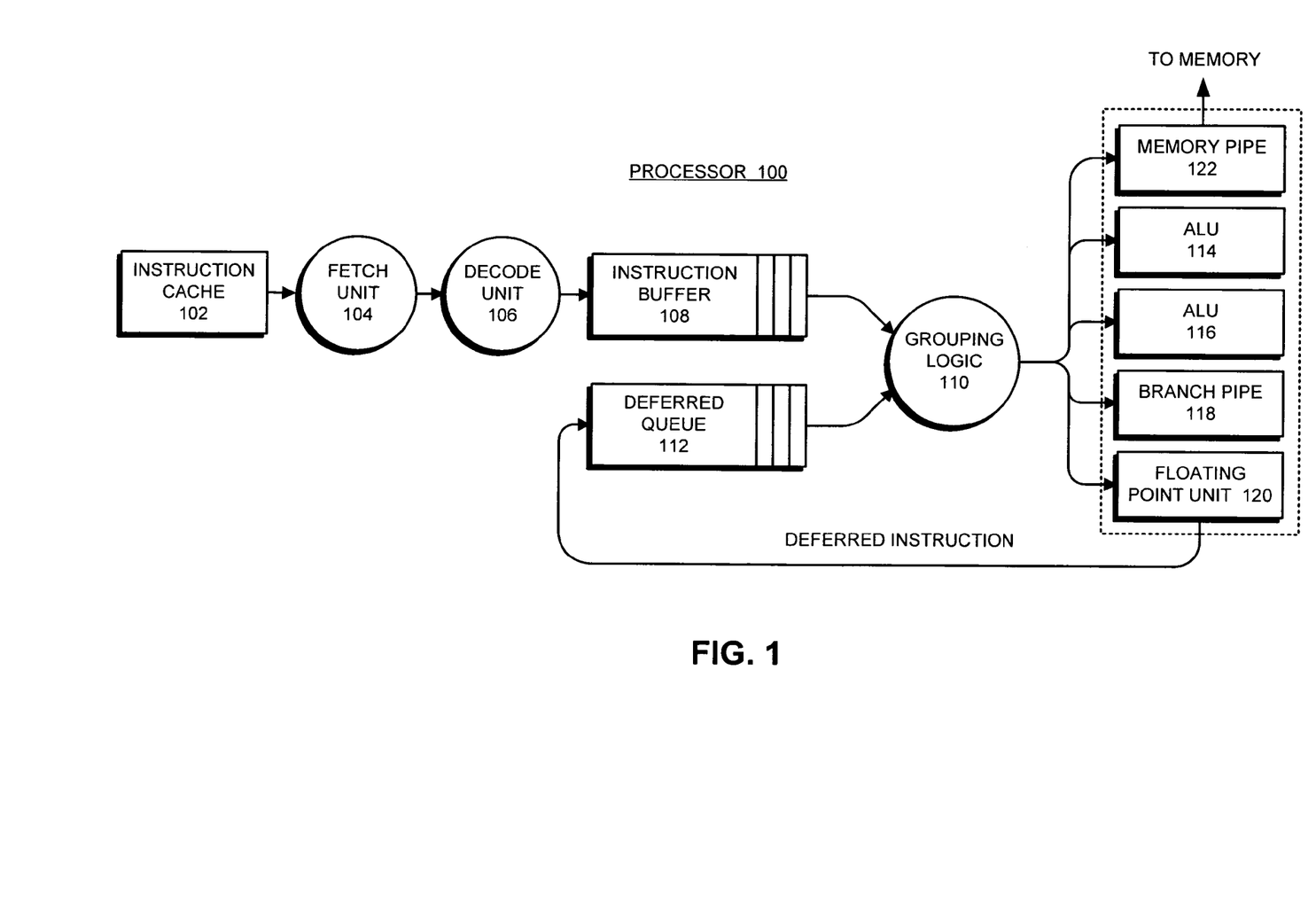
FIG. 1 illustrates the design of a processor that supports speculative-execution in accordance with an embodiment of the present invention.

FIG. 1 illustrates the design of a processor 100 that supports speculative-execution in accordance with an embodiment of the present invention. Processor 100 can generally include any type of processor, including, but not limited to, a microprocessor, a mainframe computer, a digital signal processor, a personal organizer, a device controller, and a computational engine within an appliance. As is illustrated in FIG. 1, processor 100 includes: instruction cache 102, fetch unit 104, decode unit 106, instruction buffer 108, grouping logic 110, deferred queue 112, arithmetic logic unit (ALU) 114, ALU 116, branch pipe 118, and floating point unit 120.

During operation, fetch unit 104 retrieves instructions to be executed from instruction cache 102, and feeds these instructions into decode unit 106. Decode unit 106 forwards the instructions to be executed into instruction buffer 108, which is organized as a FIFO buffer. Instruction buffer 108 feeds instructions in program order into grouping logic 110, which groups instructions together and sends them to execution units, including memory pipe 122 (for accessing remote memory), ALU 114, ALU 116, branch pipe 118 (which resolves conditional branch computations), and floating point unit 120.

If an instruction cannot be executed due to an unresolved data dependency, such as an operand that has not returned from a load operation, the system defers execution of the instruction and moves the instruction into deferred queue 112. Deferred queue 112 is organized as a FIFO buffer.

Processor 100 is configured to support simultaneous multithreading (SMT), thereby allowing multiple threads of execution to run simultaneously on processor 100. The technical details of SMT are well-known in the art and hence a more detailed description is not provided.

Simultaneous Speculative Threading Circuit Structures

Figure 2:
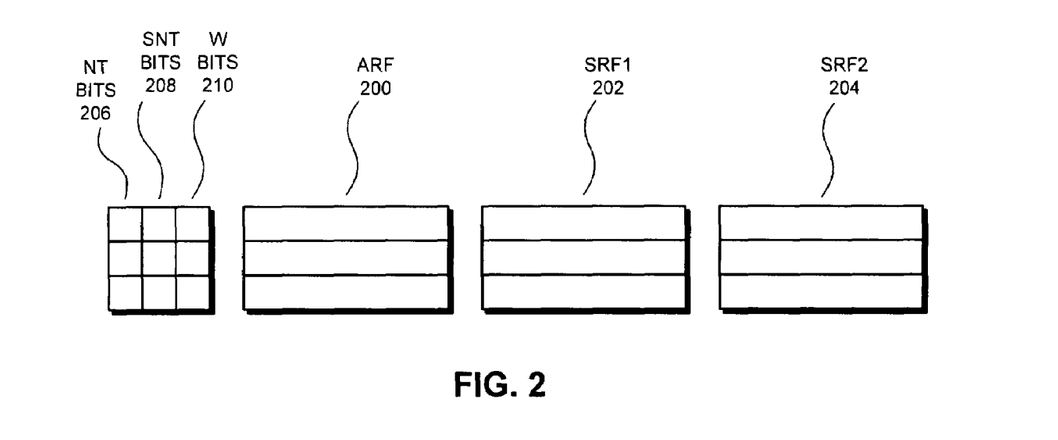
FIG. 2 illustrates a register file in accordance with an embodiment of the present invention.

FIG. 2 illustrates circuit structures that support SST on processor 100 in accordance with an embodiment of the present invention. For SST, processor 100 uses pair of cooperating threads to facilitate speculative execution. One thread serves as a "primary" thread, which executes instructions in execute-ahead mode and defers instructions that cannot be executed due to unresolved data dependencies. The other thread serves as a "subordinate" thread, which waits for the resolution of data dependencies and then executes the associated deferred instructions.

Note that the threads are labeled as "primary" and "subordinate" only for the purposes of illustration. The threads do not have distinct properties. In other words, either of the threads could serve as the primary thread or subordinate thread. In addition, the label "primary" is not associated exclusively with one thread or the other; the designation can switch from one thread to the other at runtime.

The circuit structures in the SST processor include architectural register file (ARF) 200, shadow register file 1 (SRF1) 202, and shadow register file 2 (SRF2) 204. In addition, processor 100 includes "not-there" (NT) bits 206, speculative "not-there" bits (SNT) 208, and "write" (W) bits 210.

ARF 200 is a register file that contains the architecturally committed value for each processor register. The primary thread stores values to ARF 200 during normal-execution mode 301 (see FIG. 3A) or "joins" speculative results into the ARF 200 upon successful completion of execute-ahead mode 303.

SRF1 202 and SRF2 204 are register files that include shadow copies of the registers in ARF 200. SRF1 202 and SRF2 204 serve as the register files for the primary and subordinate threads during speculative execution. For example, during execute-ahead mode 303, the primary thread can write speculative results to a copy of the register file, so that the speculative results can be used during execute-ahead mode 303 without overwriting the corresponding values in ARF 200. On the other hand, during deferred mode 304, the subordinate thread can write speculative results to another copy of the register file, so that the architectural values or speculative results written during execute-ahead mode 303 by the primary thread are not overwritten.

Note that the register files copies are not associated with either thread. For example, the primary thread may initially store results in SRF1 202 in execute-ahead mode 303, but after a second checkpoint is set, the primary thread begins storing results in SRF2 204. Then, when the subordinate thread executes the instructions deferred before the second checkpoint in deferred mode 304, the subordinate thread stores the results in SRF1 202. The following sections describe the use of the shadow copies of the register file in more detail.

NT bits 206 include a "not-there" bit corresponding to registers in the register file copies. During execute-ahead mode 303, the primary thread uses the NT bits 206 to keep track of whether a valid data value is contained in each register of the copy of the register file being used by the primary thread (e.g., SRF1 202 or SRF2 204).

SNT bits 208 similarly include a "speculative not-there" bit corresponding to registers in the register file copies. During deferred mode 304, the subordinate thread uses SNT bits 208 to keep track of whether a valid data value was contained in each register of the copy of the register file being used by the primary thread (e.g., SRF1 202 or SRF2 204) as the subordinate thread commenced execution in deferred mode (to avoid a WAW hazard).

Write bits 210 include a "write" bit corresponding to each register in the register file. The "write" bits are used in the same way as SNT bits 208, except that "write" bits 210 are used by the subordinate thread during deferred mode 304. During deferred mode 304, the subordinate thread uses the "write" bits to keep track of whether a valid data value is contained in each register in the copy of the register file being used by the subordinate thread.

Simultaneous Speculative Threading State Diagram

Figure 3A:
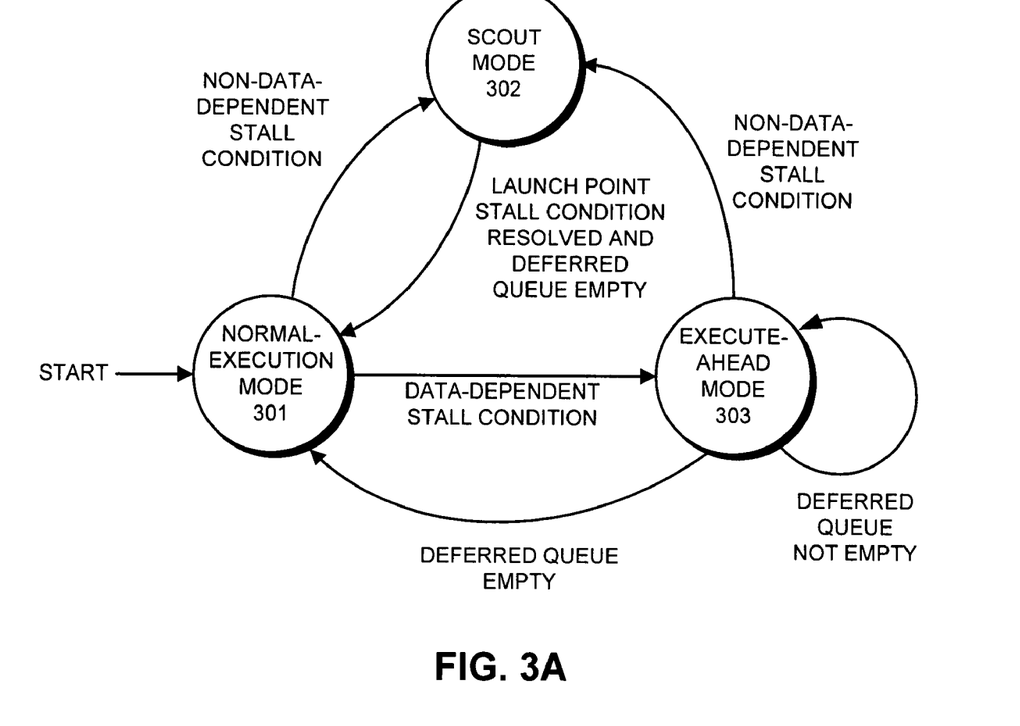
FIG. 3A presents a state diagram which includes a general depiction of normal-mode, scout mode, and execute-ahead mode in accordance with an embodiment of the present invention.
Figure 3B:
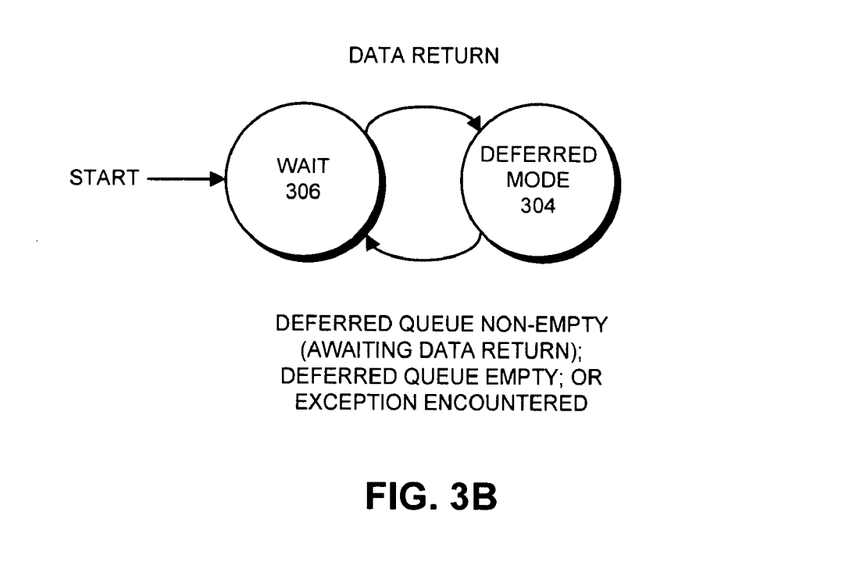
FIG. 3B presents a state diagram which includes a general depiction of deferred mode and wait mode in accordance with an embodiment of the present invention.

FIG. 3A presents a state diagram for a "primary" thread on a processor configured for simultaneous speculative threading in accordance with an embodiment of the present invention. FIG. 3B presents a state diagram for an associated "subordinate" thread on a processor configured for simultaneous speculative threading in accordance with an embodiment of the present invention.

Referring to FIG. 3A, the primary thread starts in normal-execution mode 301, wherein the primary thread executes instructions in program order as they are issued from instruction buffer 108 (see FIG. 1). At the same time, referring to FIG. 3B, the subordinate thread starts in wait mode 306. While operating in normal-execution mode 301, the primary thread stores results to and reads values from ARF 200.

If a data-dependent stall condition arises during the execution of an instruction in normal-execution mode 301, the primary thread transitions to execute-ahead mode 303. While moving to execute-ahead mode 303, the primary thread generates an architectural checkpoint that can be used, if necessary, to return execution to the point (the "launch point") where the data-dependent stall condition was encountered. Generating the checkpoint involves saving architectural state information from processor 100 to facilitate subsequent recovery from exceptions that arise during execute-ahead mode 303 or deferred mode 304.

Along with generating the checkpoint, the primary thread "defers" execution of the instruction that encountered the unresolved data dependency by storing the instruction in deferred queue 112. Note that copies of the operands that are available at the time that the instruction is deferred are placed in deferred queue 112 along with the instruction, thereby avoiding a read-after-write (RAW) hazard which may otherwise occur when the deferred instruction is subsequently executed in deferred mode 304. As the instruction is deferred, the primary thread asserts the NT bit 206 for the destination register for the instruction.

While operating in execute-ahead mode 303, the primary thread continues to execute instructions in program order as they are received from instruction buffer 108, and in doing so defers any instruction that cannot execute because of an unresolved data dependency by storing the instruction in deferred queue 112 along with copies of the available instruction operands. As each instruction is deferred, the primary thread asserts the NT bit 206 for the destination register for the instruction. (Note that if a register with the NT bit 206 set is subsequently written in execute-ahead mode 303, the primary thread clears the NT bit 206.)

During execute-ahead mode 303, the primary thread stores the results from the speculative execution of instructions to a copy of the shadow register files (i.e., either SRF1 202 or SRF2 204). (For the purposes of illustration, we assume that the primary thread stores speculative results into SRF1 202.) Furthermore, the primary thread initially reads the inputs for instructions from ARF 200. However, as speculative results are written into SRF1 202, the subordinate thread uses the speculative results as inputs.

When a data dependency is resolved during execute-ahead mode 303, the system signals the subordinate thread to leave wait mode 306 and to commence execution in deferred mode 304. In deferred mode 304, the subordinate thread attempts to execute each of the deferred instructions in deferred queue 112. In doing so, the subordinate thread attempts to execute these instructions in program order with respect to other deferred instructions in deferred queue 112; but not with respect to non-deferred instructions previously executed by the primary thread, and not with respect to deferred instructions executed in any other passes through deferred queue 112. During deferred mode 304, the subordinate thread re-defers deferred instructions that still cannot be executed because of unresolved data dependencies by placing the re-deferred instructions back into deferred queue 112 in program order along with a copy of the available instruction operands. During deferred mode 304, the subordinate thread uses the W bit 210 to track which registers contain valid data values (i.e., which registers were speculatively written versus which registers are the destination registers for re-deferred instructions).

Before the subordinate thread commences the execution of deferred instructions from deferred queue 112, the primary thread updates a "deferred queue indicator" associated with deferred queue 112. This indicator prevents the subordinate thread from executing deferred instructions which were deferred by the primary thread while the subordinate thread executes in deferred mode 304.

In addition, the primary thread generates a "speculative" checkpoint. As with generating an architectural checkpoint, generating a speculative checkpoint involves saving architectural state information from processor 100 to facilitate subsequent recovery from exceptions. The speculative checkpoint is initially "inactive," meaning that processor 100 does not return to the speculative checkpoint in the event of an exception. Instead, processor 100 returns to the architectural checkpoint in the event of an exception. The architectural checkpoint remains the active checkpoint until all of the deferred instructions in the program code between the architectural checkpoint and the speculative checkpoint are executed by the subordinate thread in deferred mode 304. When these deferred instructions are successfully executed, processor 100 removes the architectural checkpoint and activates the speculative checkpoint. In this way, the speculative checkpoint becomes the architectural checkpoint—the checkpoint that processor 100 returns to in the event of an exception.

The primary thread retains the architectural checkpoint until the speculative checkpoint is properly updated because the subordinate thread could encounter an exception while executing the deferred instructions in deferred mode 304. In the event that the subordinate thread encounters such an exception, the subordinate thread signals the primary thread that an exception has occurred. The subordinate thread then halts execution in deferred mode 304 and resumes wait mode 306. Upon receiving this signal, the primary thread restores the architectural checkpoint and resumes execution in normal-execution mode 301.

Because the architectural checkpoint still exists, the speculative checkpoint is an additional checkpoint which must be maintained by processor 100. Hence, processor 100 must support multiple checkpoints. A system that supports multiple checkpoints on a single processor is described in more detail in a pending U.S. patent application entitled, "The Generation of Multiple Checkpoints in a Processor that Supports Speculative Execution," by inventors Shailender Chaudhry, Marc Tremblay, and Paul Caprioli having Ser. No. 11/084,655, and filing date 18 Mar. 2005, and which is hereby incorporated by reference to describe implementation details involved in supporting multiple checkpoints.

While generating the speculative checkpoint, the system copies the NT bits 206 into the SNT bits 208, thereby capturing the "not-there" state of the registers (i.e., the not-there state existed when the checkpoint was generated) in SRF1 202. Then, before speculatively writing a result to a shadow copy of the register in deferred mode 304, the subordinate thread determines if the SNT bit 208 is set for the register. If the SNT bit 208 is not set, the subordinate thread does not store the result, thereby preventing the subordinate thread from overwriting a subsequent speculative result written by the primary thread in execute-ahead mode 303 (avoiding a WAW hazard). Otherwise, the subordinate thread stores the result.

As the subordinate thread executes in deferred mode 304, the primary thread continues to execute instructions in execute-ahead mode 303, and in doing so, defers any instructions that cannot execute because of unresolved dependencies to deferred queue 112. As each instruction is deferred, the primary thread asserts the NT bit 206 for the destination register for the instruction.

Although continuing to operate in execute-ahead mode 303, the primary thread begins to write the speculative results into the other copy of the shadow register file. For example, if the primary thread was originally writing the results of speculative execution into SRF1 202, after setting the speculative checkpoint, the primary thread begins to write the results into SRF2 204. At the same time, the subordinate thread writes the results from deferred mode 304 execution into the SRF1 202.

After a pass through deferred queue 112 in deferred mode 304, some re-deferred instructions may remain in deferred queue 112. If so, the subordinate thread shifts to wait mode 306 and waits for another data return before executing the re-deferred instructions. When another data return occurs, the subordinate thread leaves wait mode 306 and commences executing in deferred mode 304, and in doing so, makes another pass through deferred queue 112. The subordinate thread continues to make passes through deferred queue 112 until all the deferred instructions (at locations before the deferred queue indicator) in deferred queue 112 have been executed.

When the deferred instructions before the deferred queue indicator have been executed, the subordinate thread asserts the deferred-queue-empty signal, which is communicated to the primary thread. The subordinate thread then returns to wait mode 306. Upon receiving this signal, the system merges the results of speculative-execution (produced during both execute-ahead mode 303 and deferred mode 304) with the results already present in the architectural checkpoint. Then, the system discards the architectural checkpoint and "activates" the speculative checkpoint. The system also clears the SNT bits 208 and the W bits 210.

The primary thread then checks the status of deferred queue 112. If the primary thread deferred instructions into deferred queue 112 while the subordinate thread was executing in deferred mode 304, the primary thread continues to operate in execute-ahead mode 303. When data returns for the deferred instructions, the primary thread signals the subordinate thread to leave wait mode 306 and to commence execution in deferred mode 304 as described in the preceding paragraphs.

Until the deferred queue is completely empty, the threads may continuously repeat this pattern of operation. Hence, the primary thread may continue to execute instructions which can be executed and defer those which cannot be executed due to an unresolved data dependency, while the subordinate thread trails the primary thread, executing the deferred instructions when data returns for these instructions.

Otherwise, the subordinate thread eventually completely empties deferred queue 112. When the subordinate thread empties deferred queue 112, the primary thread discards all checkpoints, joins the results of speculative execution with the architectural state of the processor and returns to normal-execution mode 301. When the primary thread returns to normal-execution mode 301, the subordinate thread remains in wait mode 306.

Processing Instructions in Execute-Ahead Mode

Figure 4:
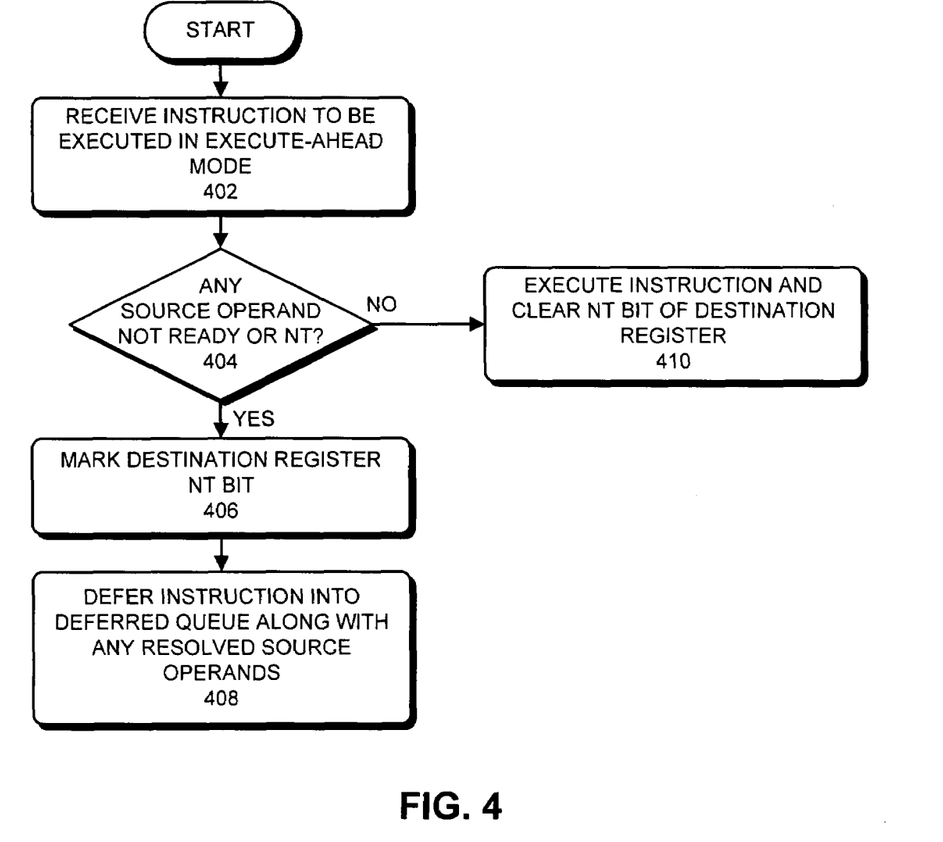
FIG. 4 presents a flow chart illustrating how instructions are processed in execute-ahead mode by the primary thread in accordance with an embodiment of the present invention.

FIG. 4 presents a flow chart illustrating how instructions are processed in execute-ahead mode 303 by the primary thread in accordance with an embodiment of the present invention. The process starts when the primary thread receives an instruction to be executed during execute-ahead mode 303 (step 402).

Next, the primary thread determines if any source operand for the instruction is "not ready" or is "not there" (step 404). A source operand is "not ready" if a memory reference has not returned a value for the source operand. For example, a source operand is not-ready if the operand has not returned from: a preceding load miss, a preceding translation lookaside buffer (TLB) miss, or a preceding full or partial read-after-write (RAW) from store buffer operation. A source operand is "not there" if the not-there bit 206 of a register containing the source operand is set.

If any source operand for the instruction is not ready or is not there, the primary thread marks the NT bit 206 of the destination register for the instruction (step 406) and defers the instruction by placing the instruction in deferred queue 112 (step 408).

On the other hand, if all source operands for the instruction are available, the primary thread executes the instruction, and writes a result (if there is one) to the destination register. The primary thread also clears the NT bit 206 of the destination register to indicate that the value in the destination register has been resolved (step 410).

Processing Instructions in Deferred Mode

Figure 5:
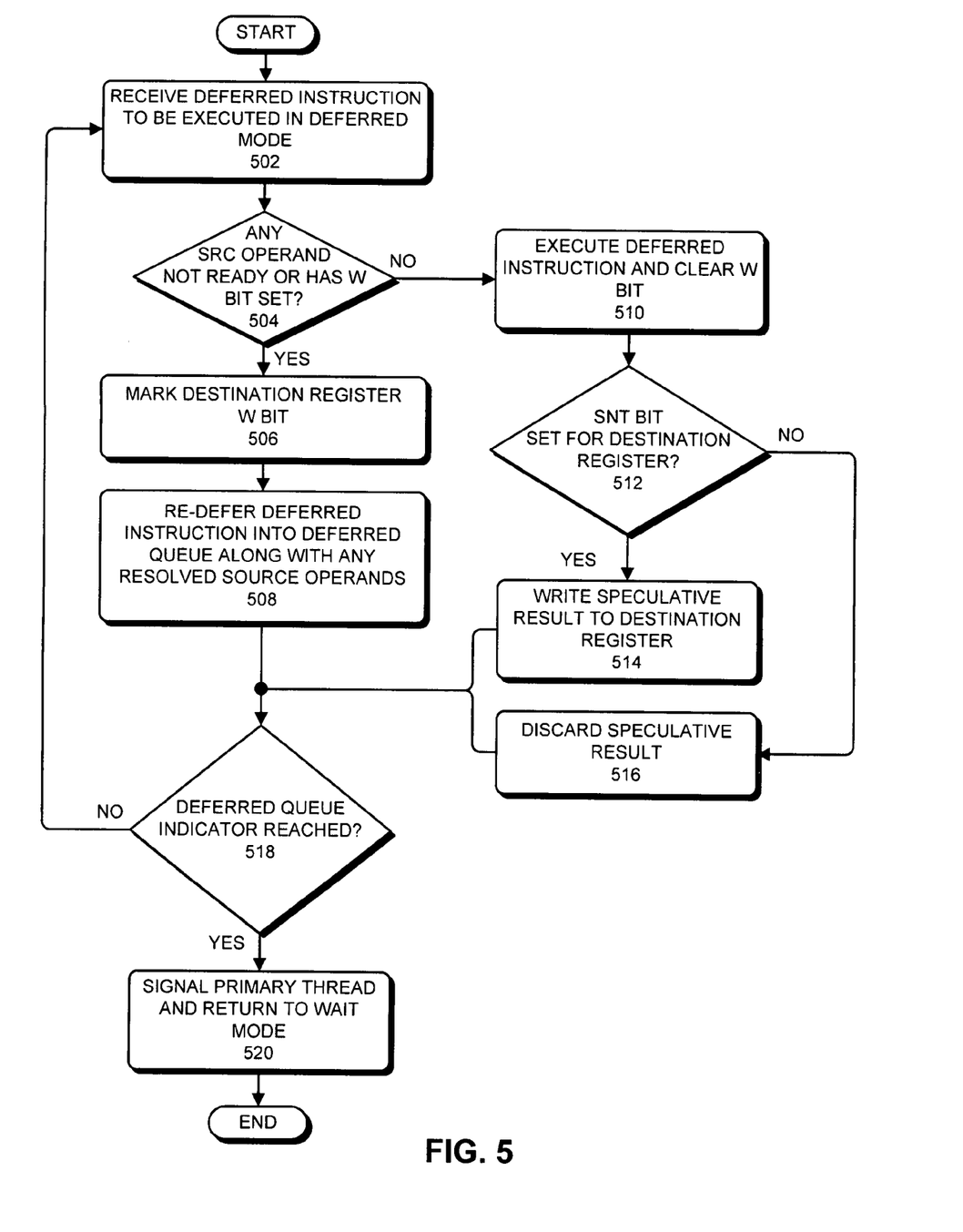
FIG. 5 presents a flow chart illustrating how instructions are processed in deferred mode by the subordinate thread in accordance with an embodiment of the present invention.

FIG. 5 presents a flow chart illustrating how instructions are processed in deferred mode 304 by the subordinate thread in accordance with an embodiment of the present invention. The process starts when the subordinate thread receives a deferred instruction to be executed during deferred mode 304 (step 502). Note that the system generates a speculative checkpoint (see FIGS. 3A-3B) before entering deferred mode 304—including copying the NT bits 206 into the SNT bits 208, thereby capturing the "not-there" state of the registers (i.e., the not-there state existed when the checkpoint was generated) in the shadow copy of the register file that the subordinate thread speculatively writes during deferred mode 304.

Next, the subordinate thread determines if any source operand for the deferred instruction is "not ready" or has its W bit set (step 504). (Recall that the W bit operates in the same way as a "not-there" bit 206, except that the W bit 210 is only used during deferred mode 304. Hence, all W bits 210 are cleared before deferred mode 304 starts, and W bits 210 are only set during deferred mode 304.) If any source operand for the deferred instruction is not ready or the register for source operand has its W bit 210 asserted, the thread marks the W bit 210 of the destination register for the instruction (step 506). The subordinate thread also re-defers the instruction by placing the instruction in the deferred queue 112 (step 508).

On the other hand, if all the source operands for the deferred instruction are available, the subordinate thread executes the deferred instruction and clears the W bit 210 for the destination register (step 510). Then, before speculatively writing a result to a shadow copy of the register in deferred mode 304, the subordinate thread determines if the SNT bit 208 is set for the register (step 512). If the SNT bit 208 is not set, the subordinate thread does not store the result, thereby preventing the subordinate thread from overwriting a subsequent speculative result written by the primary thread in execute-ahead mode 303 (avoiding a WAW hazard) (step 516). Otherwise, the subordinate thread stores the result (step 514).

If the subordinate thread determines that the deferred queue indicator has been reached (step 518), the subordinate thread asserts the deferred-queue-empty signal, which is communicated to the primary thread. The subordinate thread then returns to wait mode 306 (step 520). Otherwise, if the deferred queue indicator has not been reached, the subordinate thread returns to step 502 to execute the next instruction in deferred mode 304.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for preventing data hazards during simultaneous speculative threading, comprising:

executing instructions in an execute-ahead mode using a first thread, wherein executing instructions in the execute-ahead mode involves maintaining dependency information for each register indicating whether the register is subject to an unresolved data dependency;

upon the resolution of a data dependency during execute-ahead mode, copying a dependency information to a speculative copy of the dependency information;

commencing execution of the deferred instructions in a deferred mode using a second thread; and while executing instructions in the deferred mode, if the speculative copy of the dependency information for a destination register indicates that a write-after-write (WAW) hazard exists with a subsequent non-deferred instruction executed by the first thread in execute-ahead mode, the method further comprises executing the deferred instruction to produce a result, and forwarding the result to be used by subsequent deferred instructions, without committing the result to the architectural state of the destination register;

wherein the second thread makes the result available to the subsequent deferred instructions without overwriting a result produced by a following non-deferred instruction;

wherein the dependency information includes a "not-there" bit, which indicates whether or not a value to be stored in the register by a preceding instruction is subject to an unresolved data dependency and is consequently not available, and a speculative "not-there" bit, which indicates whether or not the register was subject to an unresolved data dependency when the second thread commenced execution in deferred mode; and wherein copying the dependency information to the speculative copy of the dependency information involves copying the "not-there" bits to the speculative "not-there" bits.

2. The method of claim 1, wherein while executing an instruction during the execute-ahead mode, the not-there bit of a destination register for the instruction is set if a value to be stored in the destination register is "not-ready" or if any source operand of the instruction is not-there, and wherein the "not-there" bit of a destination register for the instruction is unset if a valid result is written to the destination register.

3. The method of claim 2, wherein the dependency information maintained for each register includes a "write" bit, which indicates whether or not a value to be stored in the register during the deferred mode is subject to an unresolved data dependency; and wherein while executing a deferred instruction during the deferred mode, the "write" bit of the destination register for the deferred instruction is set if a value to be stored in the destination register is "not-ready," or if any source operand of the instruction has a "write" bit that is set, and wherein the "write" bit of a destination register for the instruction is unset if a valid result is written to the destination register.

4. The method of claim 3, wherein dependency information for a destination register indicates that a WAW hazard potentially exists with a subsequent non-deferred instruction when the speculative "not-there" bit is unset, indicating that the destination register for a deferred instruction had no unresolved dependency as the second thread commenced execution in deferred mode.

5. The method of claim 1, wherein during execute-ahead mode instructions that can be executed are issued for execution and instructions that cannot be executed because of an unresolved data dependency are deferred into a deferred queue.

6. The method of claim 1, wherein during deferred mode deferred instructions that are able to be executed are executed in program order while deferred instructions that still cannot be executed because of unresolved data dependencies are re-deferred.

7. An apparatus for preventing data hazards during simultaneous speculative threading, comprising:

a processor;

execution mechanism on the processor;

wherein the execution mechanism is configured execute instructions in an execute-ahead mode using a first thread, wherein the execution mechanism is configured to maintain dependency information for each register indicating whether the register is subject to an unresolved data dependency;

upon the resolution of a data dependency during execute-ahead mode, the execution mechanism is configured to copy a dependency information to a speculative copy of the dependency information and to commence execution of the deferred instructions in a deferred mode using a second thread; and while executing in the deferred mode, if the speculative copy of the dependency information for a destination register indicates that a WAW hazard exists with a subsequent non-deferred instruction executed by the first thread in execute-ahead mode, the execution mechanism is configured to execute the deferred instruction to produce a result and to forward the result to be used by subsequent deferred instructions, without committing the result to the architectural state of the destination register;

wherein the dependency information includes a "not-there" bit, which indicates whether or not a value to be stored in the register by a preceding instruction is subject to an unresolved data dependency and is consequently not available, and a speculative "not-there" bit, which indicates whether or not the register was subject to an unresolved data dependency when the second thread commenced execution in deferred mode; and wherein when copying the dependency information to the speculative copy of the dependency information, the execution mechanism is configured to copy the "not-there" bits to the speculative "not-there" bits.

8. The apparatus of claim 7, wherein while executing an instruction during the execute-ahead mode, the execution mechanism is configured to set the not-there bit of a destination register for the instruction if a value to be stored in the destination register is "not-ready" or if any source operand of the instruction is not-there and to unset "not-there" bit of a destination register for the instruction if a valid result is written to the destination register.

9. The apparatus of claim 8, wherein the dependency information maintained for each register includes a "write" bit, which indicates whether or not a value to be stored in the register during the deferred mode is subject to an unresolved data dependency; and wherein while executing a deferred instruction during the deferred mode, the execution mechanism is configured to set the "write" bit of the destination register for the deferred instruction if a value to be stored in the destination register is "not-ready," or if any source operand of the instruction has a "write" bit that is set and to unset the "write" bit of a destination register for the instruction if a valid result is written to the destination register.

10. The apparatus of claim 9, wherein dependency information for a destination register indicates that a WAW hazard potentially exists with a subsequent non-deferred instruction when the speculative "not-there" bit is unset, indicating that the destination register for a deferred instruction had no unresolved dependency when the execution mechanism commenced execution in the deferred mode using the second thread.

11. The apparatus of claim 7, wherein during execute-ahead mode the execution mechanism is configured to issue instructions that can be executed for execution and to defer instructions that cannot be executed because of an unresolved data dependency into a deferred queue.

12. The apparatus of claim 7, wherein during deferred mode the execution mechanism is configured to execute deferred instructions that are able to be executed in program order while re-deferring deferred instructions that still cannot be executed because of unresolved data dependencies.

13. A computer system for preventing data hazards during simultaneous speculative threading, comprising:

a processor;

a memory coupled to the processor, wherein the processor stores and retrieves data and instructions from the memory;

an execution mechanism on the processor;

wherein the execution mechanism is configured execute instructions in an execute-ahead mode using a first thread, wherein the execution mechanism is configured to maintain dependency information for each register indicating whether the register is subject to an unresolved data dependency;

upon the resolution of a data dependency during execute-ahead mode, the execution mechanism is configured to copy a dependency information to a speculative copy of the dependency information and to commence execution of the deferred instructions in a deferred mode using a second thread; and while executing in the deferred mode, if the speculative copy of the dependency information for a destination register indicates that a WAW hazard exists with a subsequent non-deferred instruction executed by the first thread in execute-ahead mode, the execution mechanism is configured to execute the deferred instruction to produce a result and to forward the result to be used by subsequent deferred instructions, without committing the result to the architectural state of the destination register;

wherein the dependency information includes a "not-there" bit, which indicates whether or not a value to be stored in the register by a preceding instruction is subject to an unresolved data dependency and is consequently not available, and a speculative "not-there" bit, which indicates whether or not the register was subject to an unresolved data dependency when the second thread commenced execution in deferred mode; and wherein when copying the dependency information to the speculative copy of the dependency information, the execution mechanism is configured to copy the "not-there" bits to the speculative "not-there" bits.

14. The computer system of claim 13, wherein while executing an instruction during the execute-ahead mode, the execution mechanism is configured to set the not-there bit of a destination register for the instruction if a value to be stored in the destination register is "not-ready" or if any source operand of the instruction is not-there and to unset "not-there" bit of a destination register for the instruction if a valid result is written to the destination register.

15. The computer system of claim 14, wherein the dependency information maintained for each register includes a "write" bit, which indicates whether or not a value to be stored in the register during the deferred mode is subject to an unresolved data dependency; and wherein while executing a deferred instruction during the deferred mode, the execution mechanism is configured to set the "write" bit of the destination register for the deferred instruction if a value to be stored in the destination register is "not-ready," or if any source operand of the instruction has a "write" bit that is set and to unset the "write" bit of a destination register for the instruction if a valid result is written to the destination register.

16. The computer system of claim 15, wherein dependency information for a destination register indicates that a WAW hazard potentially exists with a subsequent non-deferred instruction when the speculative "not-there" bit is unset, indicating that the destination register for a deferred instruction had no unresolved dependency when the execution mechanism commenced execution in the deferred mode using the second thread.

* * * * *